United States Patent
Zhang et al.

(10) Patent No.: US 8,965,537 B2
(45) Date of Patent: Feb. 24, 2015

(54) METHOD FOR ASCERTAINING PROCESS VALUES FOR A PROCESS CONTROL

(75) Inventors: Xiao-Yi Zhang, Niederrohrdorf (CH); Lucas Fischer, Uster (CH); Evan Foy, Baden (CH)

(73) Assignee: Alstom Technology Ltd, Baden (CH)

( * ) Notice: Subject to any disclaimer, the term of this patent is extended or adjusted under 35 U.S.C. 154(b) by 513 days.

(21) Appl. No.: 13/281,865

(22) Filed: Oct. 26, 2011

(65) Prior Publication Data

US 2012/0109341 A1    May 3, 2012

(30) Foreign Application Priority Data

Oct. 27, 2010   (EP) ..................................... 10189030

(51) Int. Cl.
 *G05D 13/02* (2006.01)
 *G05B 17/02* (2006.01)
 *G05B 13/04* (2006.01)

(52) U.S. Cl.
 CPC .............. *G05B 17/02* (2013.01); *G05B 13/041* (2013.01)
 USPC ........................................................... 700/30

(58) Field of Classification Search
 CPC ...................................... G05B 13/041
 USPC ....................... 700/28, 29, 30, 287
 See application file for complete search history.

(56) References Cited

U.S. PATENT DOCUMENTS

| 5,777,872 A | 7/1998 | He |
| 2003/0102383 A1 | 6/2003 | Nanno et al. |
| 2004/0054440 A1 | 3/2004 | Zhang et al. |
| 2009/0138170 A1 * | 5/2009 | Nemet et al. .................. 701/100 |

FOREIGN PATENT DOCUMENTS

| EP | 1321836 A1 | 6/2003 |
| EP | 2177963 A1 | 4/2010 |

OTHER PUBLICATIONS

European Search Report issued on Mar. 30, 2011, for European Application No. 10189030.9.

* cited by examiner

*Primary Examiner* — Sean Shechtman
*Assistant Examiner* — Chad Rapp
(74) *Attorney, Agent, or Firm* — Buchanan Ingersoll & Rooney PC

(57) ABSTRACT

A method for ascertaining process values for a process control is provided. The method includes detecting a measured value, providing a model that simulates the process, and, on the basis of the model, calculating a calculated real value and a calculated measured value. The method also includes comparing the calculated real value with the calculated measured value to obtain a delay compensation value, and adding the delay compensation value to the measured value to obtain an accelerated value indicative of the process value to be ascertained.

12 Claims, 2 Drawing Sheets

METHOD FOR ASCERTAINING PROCESS VALUES FOR A PROCESS CONTROL

RELATED APPLICATION

This application claims priority under 35 U.S.C. §119 to European Patent Application No. 10189030.9 filed in Europe on Oct. 27, 2010, the entire content of which is hereby incorporated by reference in its entirety.

FIELD

The present disclosure relates to a method for ascertaining process values for a process control. For example, the method can be applied to ascertain process values of a gas turbine.

BACKGROUND INFORMATION

The market requirements with respect to gas turbine dynamic behavior are becoming increasingly stringent, and the capacity to quickly and accurately adjust the gas turbine load during transient phases is required.

In order to adjust the process values of a gas turbine, closed loop controls are implemented driven on the basis of measured values, such as pressures or temperatures measured at different locations of the gas turbine or the power output measured at the generator.

FIG. 1 shows a diagram of a known closed-loop control scheme.

Known methods consist of measuring a value (for example a temperature, a pressure or a power at a particular section of a gas turbine) and comparing the measured value with a desired value to calculate an error that is supplied to a control unit that generates one or more manipulated values to be used to drive the process, such that the error becomes zero.

In order to correctly control and promptly adjust the manipulated values in accordance with the variable operating conditions, these measured values must be as accurate as possible.

When a process value (for example, the pressure at the outlet of the compressor or the temperature of the exhaust gases) is measured, the feedback value at the control unit can be affected by two delays.

1) Process delays: a machine such as a gas turbine has a thermodynamic process that involves heat transfer, mass transfer and chemical reactions. For instance, transient phases are mainly influenced by volumes and masses, since during transient phases the volumes store or discharge fuel, air, exhaust gas and the masses absorb or release heat. Volume and masses bring delays to the gas turbine process.

2) Measurement delays: sensors can introduce a pure delay (dead time) and dynamic lag in the measuring process. For example, with temperature measurements, pure delays are introduced by communications delays and measurement conditioning, and dynamic lag is introduced by the heat transfer coefficient between the source and the sensor. With other measurements, the pure delay and dynamic lag will be different (for example, pressure or power measurements are relatively fast).

Thus, the measured values received by the control unit are delayed. For example, a measured process value supplied from a sensor and received by a control unit at the time $t_1$ is indicative of the real value in the gas turbine at a precedent time $t_0$.

These delays slow down the gas turbine control.

SUMMARY

An exemplary embodiment of the present disclosure provides a method for ascertaining process values for a process control. The exemplary method includes detecting a measured value indicative of the process values to be ascertained, and providing a model that simulates the process. The exemplary method also includes calculating, on the basis of the model, (i) a calculated real value of the process values to be ascertained, and (ii) a calculated measured value indicative of the real value. In addition, the exemplary method includes comparing the calculated real value with the calculated measured value to obtain a delay compensation value, and adding the delay compensation value to the measured value to obtain an accelerated value indicative of the process values to be ascertained.

An exemplary embodiment of the present disclosure provides a non-transitory computer-readable recording medium having a program tangibly recorded thereon that causes a processor a computer processing device to execute operations for ascertaining process values for a process control. The program causes the processor to carry out operations including: detecting a measured value indicative of the process values to be ascertained; providing a model that simulates the process; calculating, on the basis of the model, (i) a calculated real value of the process values to be ascertained, and (ii) a calculated measured value indicative of the real value; comparing the calculated real value with the calculated measured value to obtain a delay compensation value; and adding the delay compensation value to the measured value to obtain an accelerated value indicative of the process values to be ascertained.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
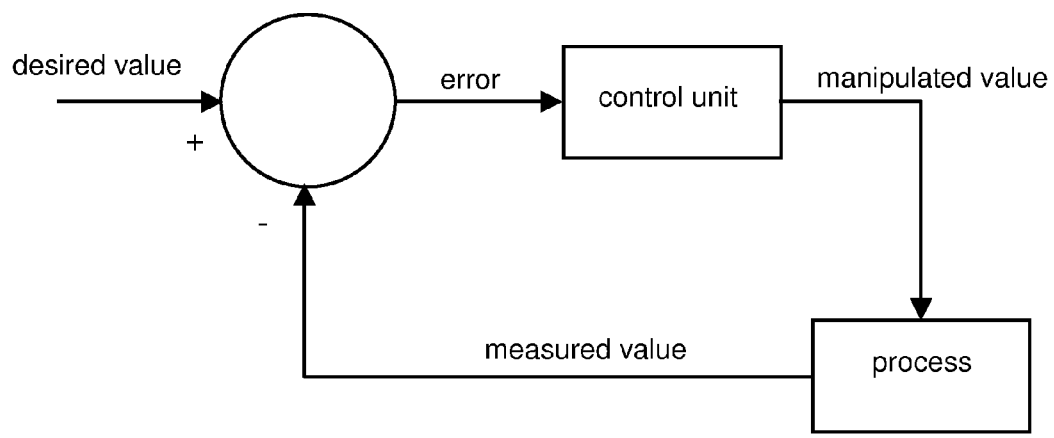
FIG. 1 is a sketch showing a known process for ascertaining process values.

Exemplary embodiments of the present disclosure provide a method to compensate for the above-described delays associated with known techniques.

Exemplary embodiments of the present disclosure provide a method with which the regulation of a machine (such as gas turbine) becomes faster.

Exemplary embodiments of the present disclosure provide a method for ascertaining process values for a process control. The exemplary method can be used to ascertain any process values and to control any kind of a plant or process. In the following, for the sake of simplicity, exemplary embodiments of the present disclosure are described with reference to a gas turbine.

According to an exemplary embodiment of the method, a measured value indicative of a process value to be ascertained is detected; for example, a temperature in a particular position of the gas turbine is detected with a sensor.

In addition, a model that simulates the process is also provided. In accordance with an exemplary embodiment, the model is a traditional model that allows the process to be simulated. For example, for gas turbines, a number of models are available to calculate process values such as pressure, temperature, power in different locations.

On the basis of this model, a calculated real value of the process value to be ascertained, and a calculated measured value indicative of the real value are calculated. The calculated real value is the real value that the process value has in the model. Thus, with reference to the previous example, the calculated real value can be the value of the temperature calculated on the basis of the model. The calculated measured value is the value that is measured in the model, for example, the model also simulates the sensors and the values that they detect.

Thus, the calculated real value is compared with the calculated measured value to obtain a delay compensation value. For example, this delay compensation value is the difference between the calculated real value and the calculated measured value.

The delay compensation value is then added to the measured value to obtain an accelerated value indicative of the process value to be ascertained.

The accelerated value is then compared with a desired value of the process value to be ascertained to obtain an error (the difference between these values is made), on the basis of which a manipulated value is calculated. This manipulated value is used to control the process.

In accordance with an exemplary embodiment, the model has the manipulated value as an input.

In accordance with an exemplary embodiment, the measured values are measured during the gas turbine operation and the operational process values to be ascertained are the pressure at the outlet of the compressor, the power at the generator terminals of an electric generator to which the turbine is connected, and the turbine outlet temperature.

In accordance with an exemplary embodiment, the method is applied to ascertain process values having different dynamics (for example temperature, pressure, etc.), to accelerate all the process values to the same dynamic and/or calculate all the process values together and/or use all the process values in the same control scheme.

Figure 2:
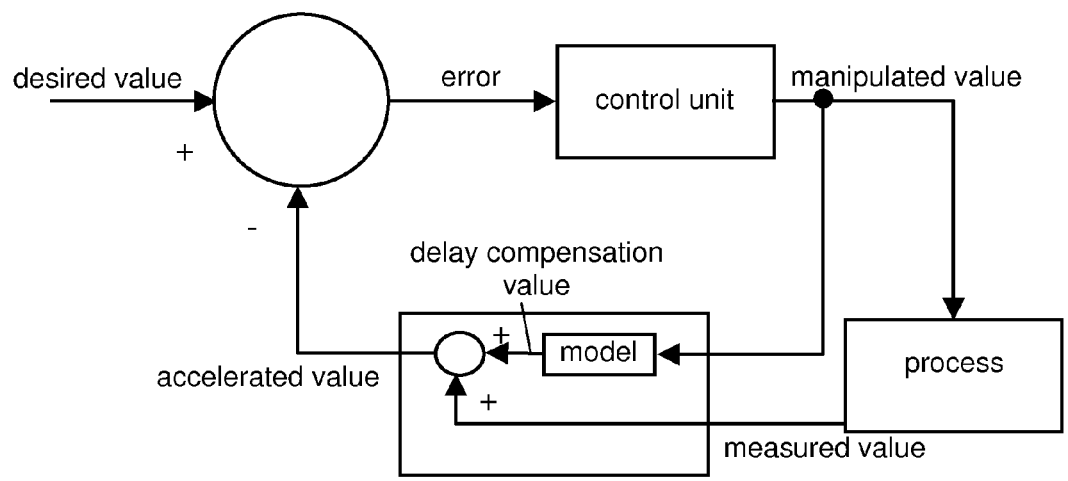
FIG. 2 is a sketch showing a process for ascertaining process values according to an exemplary embodiment of the present disclosure.

In accordance with an exemplary embodiment, the functional block units illustrated in FIG. 2 can be implemented by appropriate hardware components (e.g., digital and/or analog circuitry) to carry out the operative functions described herein. In addition, the functional block units can be implemented by a processor of a computer processing device executing a computer program tangibly recorded on a non-transitory computer-readable recording medium, such as a hard disk drive, optical memory, flash memory, or any other type of non-volatile memory.

Calculations

In practice, the following equation is applied to correct the measured process values:

$$Y_{accelerated} = Y_{measured} + (Y_{model, real\ value} - Y_{model, measured})$$

wherein:

$Y_{accelerated}$ is the accelerated value
$Y_{measured}$ is the measured value
$Y_{model,\ real\ value}$ is the real value calculated with the model
$Y_{model,\ measured}$ is the measured value calculated with the model.

In accordance with an exemplary embodiment, the operational process values are the pressure at the outlet of the compressor, the power at the generator terminals of an electric generator to which the turbine is connected, and the turbine outlet temperature. It is in any case clear that also other process values may be ascertained according to the method.

In the cited cases, the sensors are assumed linear and their transfer function is known, thus the previous equation can be written:

$$Y_{accelerated} = Y_{measured} + (1-G(s))Y_{model, real\ value}$$

wherein $G(s)$ is the transfer function of the sensor.

Figure 3:
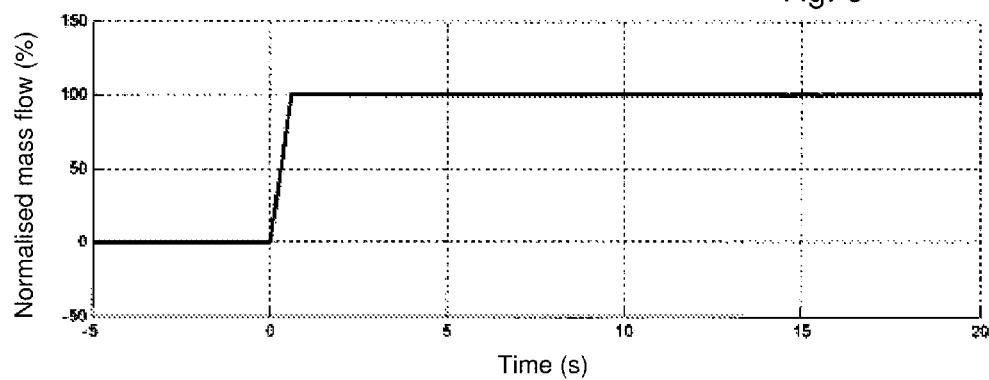
FIGS. 3-5 show a command implemented and a value measured and calculated according to exemplary embodiments of the method of the present disclosure.
Figure 4:
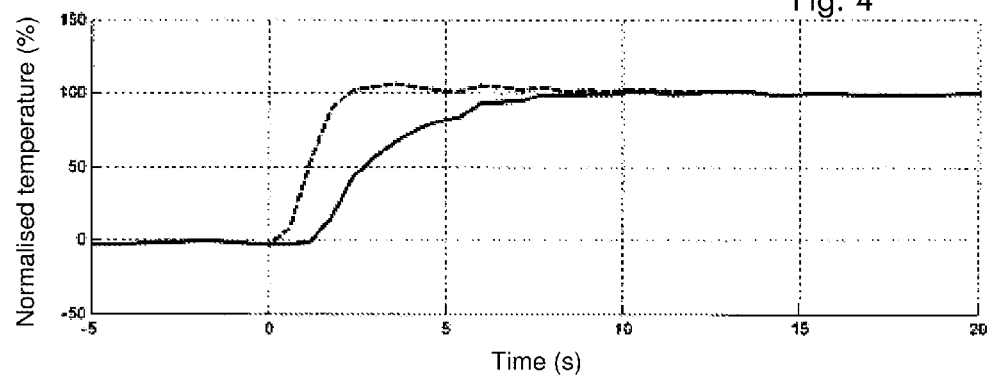
Figure 5:
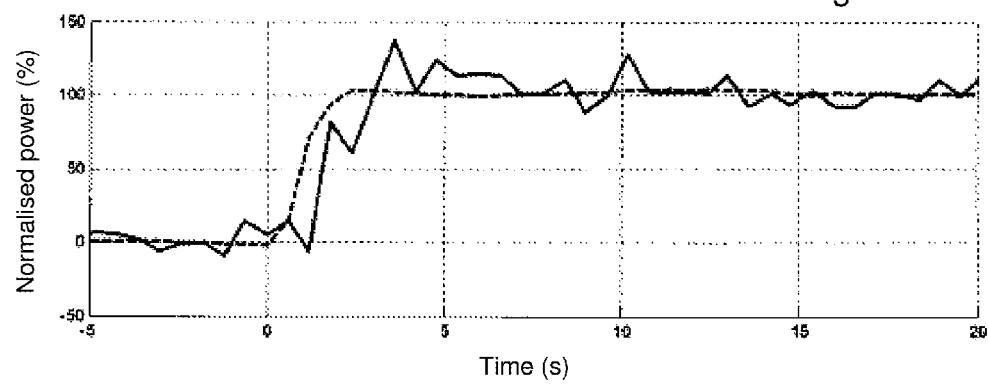

In a transient state the difference $(Y_{model, real\ value} - Y_{model, measured})$ in the first equation, or $(1-G(s))$ in the second equation, is non-zero, but when the gas turbine operates in a steady state they become zero and $Y_{accelerated} = Y_{measured}.$ Validation Tests FIGS. 3 through 5 show some values measured and calculated according to this method during an open loop fuel response test on a gas turbine.

For instance, FIG. 3 shows the fuel mass flow injected into the combustion chamber and, correspondingly, FIG. 4 shows the values respectively measured (solid line) and calculated according to the method (dashed line) of the turbine outlet temperature, and FIG. 5 shows the process values respectively measured (solid line) and calculated according to the method (dashed line) of the power at the generator.

These diagrams clearly show that the accelerated values are able to better describe the course of the real process values.

In this respect, further tests were carried out during which the operation of a gas turbine in transient conditions was controlled and regulated on the basis of values (for example, the pressure at the outlet of the compressor, the power at the generator terminals of an electric generator to which the turbine is connected, and the turbine outlet temperature) calculated according to the present method. Those tests showed that the dynamic performances of the gas turbine were significantly improved and the method proved to be practical and effective, since the values used for controlling the gas turbine are those actually present on the gas turbine when the regulation or control operations are calculated and/or implemented.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for ascertaining process values for a process control, the method comprising:
   detecting a measured value indicative of the process values to be ascertained;
   providing a model that simulates the process;
   calculating, on the basis of the model,
   (i) a calculated real value of the process values to be ascertained, and
   (ii) a calculated measured value based on the calculated real value, wherein the calculated measured value is indicative of the real value;
   comparing the calculated real value with the calculated measured value to obtain a delay compensation value; and adding the delay compensation value to the measured value to obtain an accelerated value indicative of the process values to be ascertained.

2. The method as claimed in claim 1, comprising:
comparing the accelerated value with a desired value of the process values to be ascertained to obtain an error; and
calculating, on the basis of the error, a manipulated value to control the process.

3. The method as claimed in claim 2, wherein the process is a process of a gas turbine.

4. The method as claimed in claim 3, wherein the measured value is measured during an operation of the gas turbine.

5. The method as claimed in claim 4, wherein the gas turbine includes a compressor and is connected to an electric generator with generator terminals, and
wherein the process values to be ascertained are the pressure at an outlet of the compressor, the power at the generator terminals and the temperature at an outlet of the turbine.

6. The method as claimed in claim 1, comprising:
ascertaining process values having different dynamics; and
performing at least one of (i) accelerate all the process values to the same dynamic, (ii) calculating all the process values together, and (iii) using all the process values in the same control scheme.

7. A non-transitory computer-readable recording medium having a program tangibly recorded thereon that causes a processor a computer processing device to execute operations for ascertaining process values for a process control, the program causing the processor to carry out operations comprising:
detecting a measured value indicative of the process values to be ascertained;
providing a model that simulates the process;
calculating, on the basis of the model,
(i) a calculated real value of the process values to be ascertained, and
(ii) a calculated measured value based on the calculated real value, wherein the calculated measured value is indicative of the real value;
comparing the calculated real value with the calculated measured value to obtain a delay compensation value; and
adding the delay compensation value to the measured value to obtain an accelerated value indicative of the process values to be ascertained.

8. The non-transitory computer-readable recording medium as claimed in claim 7, wherein the program causes the processor to carry out operations of:
comparing the accelerated value with a desired value of the process values to be ascertained to obtain an error; and
calculating, on the basis of the error, a manipulated value to control the process.

9. The non-transitory computer-readable recording medium as claimed in claim 8, wherein the process is a process of a gas turbine.

10. The non-transitory computer-readable recording medium as claimed in claim 9, wherein the measured value is measured during an operation of the gas turbine.

11. The non-transitory computer-readable recording medium as claimed in claim 10, wherein the gas turbine includes a compressor and is connected to an electric generator with generator terminals, and
wherein the process values to be ascertained are the pressure at an outlet of the compressor, the power at the generator terminals and the temperature at an outlet of the turbine.

12. The non-transitory computer-readable recording medium as claimed in claim 7, wherein the program causes the processor to carry out operations of:
ascertaining process values having different dynamics; and
performing at least one of (i) accelerate all the process values to the same dynamic, (ii) calculating all the process values together, and (iii) using all the process values in the same control scheme.

* * * * *